United States Patent Office 3,327,232
Patented June 20, 1967

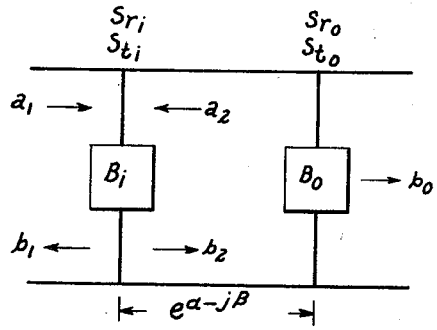
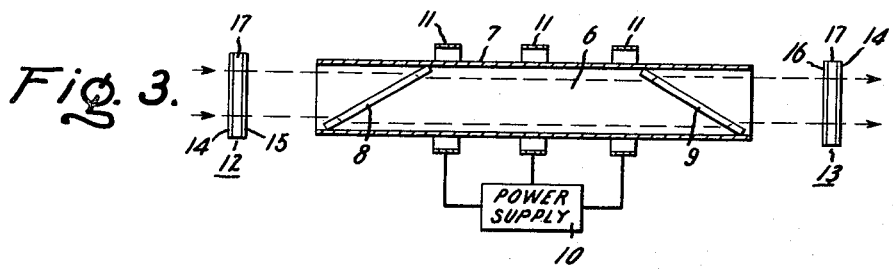
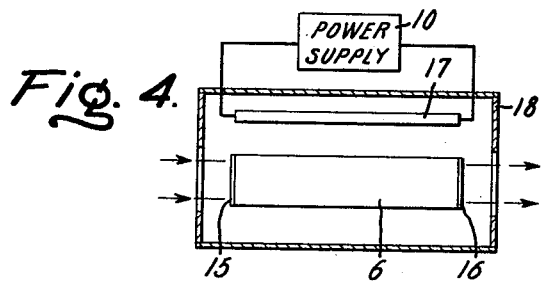
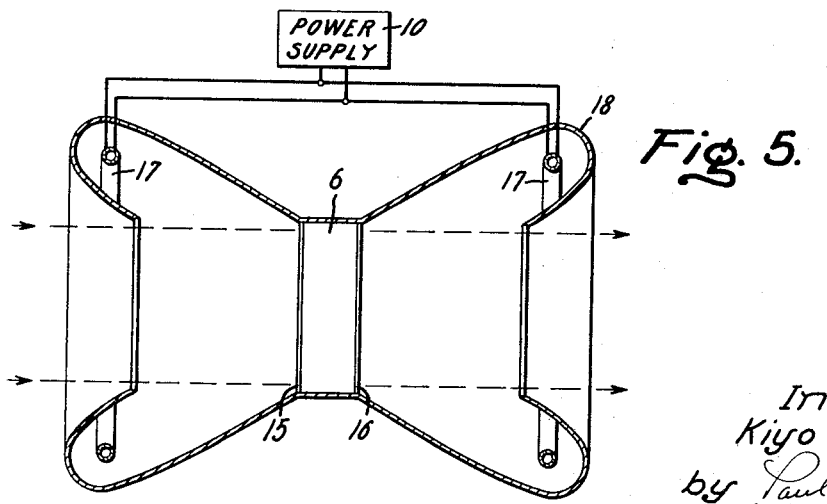

3,327,232
REFLECTIONLESS INPUT RESONANT LASER
AMPLIFIER
Kiyo Tomiyasu, Scotia, N.Y., assignor to General
Electric Company, a corporation of New York
Filed July 2, 1965, Ser. No. 469,075
11 Claims. (Cl. 330—4.3)

ABSTRACT OF THE DISCLOSURE

A reflectionless input resonant laser amplifier includes a body of laser material wherein the reflectors defining the optical resonant cavity are both partially transmissive and have unequal reflection coefficients. The reflection coefficient ($R_i$) of the input reflector is greater than that of the output ($R_o$) reflector, an impedance match condition being provided at the input by having the coefficients related by $$\frac{R_i}{R_o} = p^2$$

where $p$ is the one-way amplifier power gain.

---

My invention relates to a resonant laser amplifier, and in particular, to a laser amplifier having a reflectionless input whereby undesired loss of power reflected from the input of a laser amplifier is reduced to zero.

A recently developed device, now conventionally described as a laser (light amplification by stimulated emission of radiation), has the potential for wide application in many diverse fields such as communication, metallurgy and medicine. The laser is a light source having the radiated output therefrom predominantly in one or more narrow bands of the electromagnetic spectrum. Such output is a narrowly diverging beam of light which is usually in the visible or infrared frequency range of the electromagnetic spectrum. Specific liquids, gases and solid media have been found to exhibit the properties of the laser wherein the laser media releases electromagnetic energy which can be stored in discrete metastable states as a result of being excited or pumped by an electrical or electromagnetic signal of frequency compatible with the particular laser medium. The pumping means excites the laser media into a metastable high energy state whereupon a stimulated emission of monochromatic and directional (coherent) electromagnetic radiation is emitted from the laser media. The stimulated emission of electromagnetic radiation is initiated in the material by what is generally described as an initial spontaneous emission of electromagnetic radiation. A suitable optical resonant cavity amplifies such initial spontaneous radiation by multiple reflection within the cavity and generates the hereinbefore described stimulated emission of electromagnetic radiation emitted from the laser material. The optical resonant cavity may comprise an external cavity formed by external reflectors, or in the case of solid laser material may comprise external reflectors or suitable reflective coatings on the end surfaces of laser material to define what may be described as an internal optical resonant cavity. The reflective surfaces, whether of the internal or external optical resonant cavity type, are spaced apart an integral number of half wave lengths of the optical radiation frequency which is characteristic of a selected energy level transition in the particular laser medium which generates the stimulated emission of electromagnetic radiation.

The initially generated stimulated emission of electromagnetic radiation is generated within a device described as a laser oscillator, such device having one of the reflecting surfaces highly reflective (essentially 100% reflective) and the other surface only partially reflective (and partially transmissive) such that upon the density of excited atoms within the laser medium exceeding the critical value at which stimulated emission exceeds fluorescent radiation and other losses, a laser beam is emitted from the optical resonant cavity and passes through the partially reflective surface. Many applications require energy outputs which are higher than that obtained from the laser oscillator alone and for such cases a laser amplifier is optically coupled to the output of the oscillator. The laser amplifier is similar in construction to the laser oscillator in that a body of laser material disposed in an optical resonant cavity and a pumping means for exciting the laser material are used, the primary distinction being that the reflectors defining the amplifier cavity are both partially transmissive. In the laser amplifier, and in particular the resonant type amplifier to which my invention is directed, as opposed to the single-pass type, the unamplified laser beam generated by the laser oscillator is incident upon a first of the amplifier reflective surfaces and the amplified laser beam is emitted through the second reflective surface.

Resonant laser amplifiers obtain amplification (power gain) of an incident laser beam by a regenerative or resonant feedback (multiple reflections within the optical resonant cavity of the laser amplifier device). Prior art laser amplifiers employ equal reflectivities (reflective coefficients) for the two partially transmitting end surfaces of the cavity. In this prior art configuration, there occurs an electromagnetic wave at the input to the amplifier traveling in a direction opposite to the input wave and this reflected power represents an undesirable loss in the amplifier. This input power loss is due to a mismatch of the amplifier impedance as viewed from the input thereof.

Therefore, one of the principal objects of my invention is to provide a lasser amplifier device having no input reflective power loss.

Another important object of my invention is to obtain the reflectionless input to the amplifier by providing the reflective surfaces of the optical resonant cavity thereof with unequal reflectivities.

Briefly stated, and in accordance with my invention in meeting the objects enumerated above, I provide a resonant-type laser amplifier device wherein the laser media is disposed within an optical resonant cavity defined by a first reflective surface through which an input unamplified laser beam may enter and a second reflective surface through which the output amplified laser beam is emitted. The two reflective surfaces are spaced apart an integral number of half wave lengths of an optical radiation frequency which is characteristic of an energy level transition in the particular laser medium employed. The reflection coefficients of the first (input) and second (output) reflective surfaces are unequal, the reflection coefficient $R_i$ of the input surface being greater than the reflection coefficient $R_o$ of the second (output) surface. An impedance match condition is provided at the input to the laser amplifier by having the input and output reflection coefficients related by the ratio $$\frac{R_i}{R_o} = p^2$$

wherein $p$ is the one-way power gain of the amplifier. The impedance match condition produces a reflectionless input to the amplifier and also produces maximum power gain in the laser amplifier which is equal to $$\frac{P_o}{P_i} = \frac{1 - R_o}{1 - R_i} p$$

The advantages of the impedance match condition at the input to the amplifier cannot be obtained with equal reflection coefficient surfaces.

The features of my invention which I desire to protect herein are pointed out with particularity in the appended claims. The invention, itself, however, both as to its organization and method of operation, together with further objects and advantages thereof, may best be understood by reference to the following description taken in connection with the accompanying drawings, wherein:

FIGURE 1 is a schematic representation of a laser amplifier;

FIGURE 3 is a side view, partly in section, of a gas laser amplifier having the cavity reflective surfaces constructed in accordance with my invention;

FIGURE 4 is a side view, partly in section, of a rod-type solid material laser having reflective surfaces constructed in accordance with my invention; and FIGURE 5 is a side view, partly in section of a disk-shaped solid material laser amplifier having reflective surfaces constructed in accordance with my invention.

Figure 2:
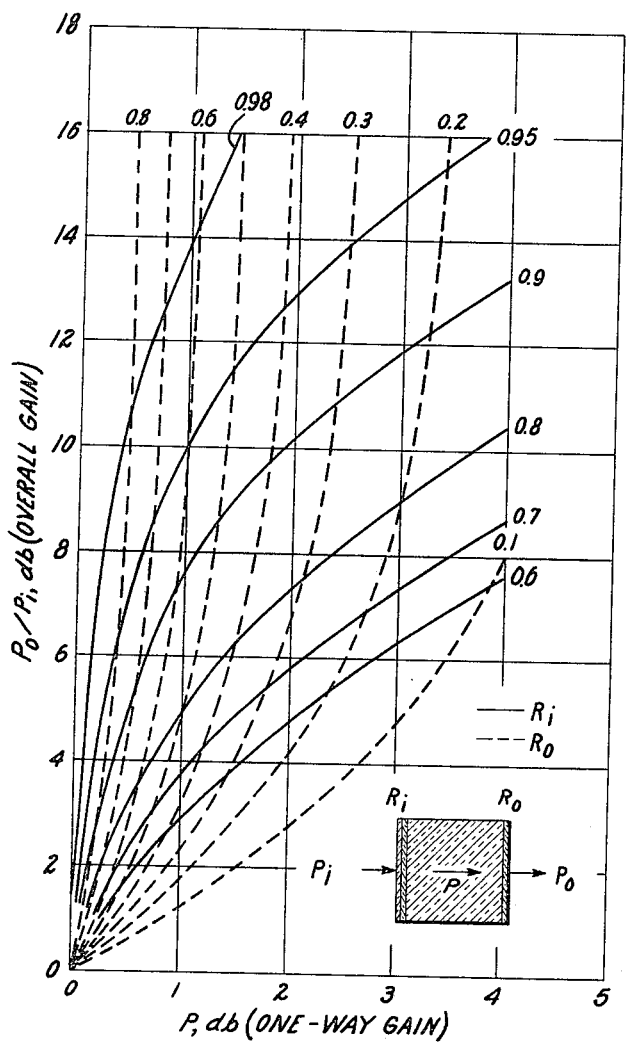
FIGURE 2 is a graphical representation of the overall power gain of a laser amplifier in terms of its one-way power gain for various reflection coefficients of the reflective surfaces defining the optical resonant cavity.

Referring particularly to FIGURE 1, there is shown a schematic representation of a laser amplifier wherein the reflection from, as well as the change in transmission through (with no absorption of power) input and output partial mirrors defining the optical resonant cavity are represented by $B_i$ and $B_o$, respectively. Thus, $B_i$ is a first partial mirror having a partially reflective (and partly transmissive) surface hereinafter referred to as the "input reflective surface" through which an input unamplified laser beam may enter, and $B_o$ is a second partial mirror hereinafter referred to as the "output reflective surface" through which the output amplified laser beam is emitted. The reflective surfaces comprise one or more coatings of selected dielectric materials as will be described in detail hereinafter. The reflective surfaces are illustrated in FIGURES 3–5 as being parallel and planar surfaces aligned with a body of laser media for exemplary reasons only, it being understood that curved surfaces as well as nonparallel and nonaligned orientation of the two surfaces may also be employed when using suitable optical lens networks. The input and output reflective surfaces are disposed at opposing ends of a body of laser medium wherein the intervening amplifying medium provides a total complex amplitude gain $e^{a-j\beta}$ in a one-way path. It is to be understood that the laser amplifier herein described is not of the single-pass type wherein an unamplified beam enters through the input (partially) reflective surface and upon passing once through the laser medium is emitted through the output (partially) reflective surface, but rather is of the resonant (i.e., regenerative or positive feedback) type wherein the photons of the laser beam make many passes back and forth within the optical resonant cavity defined by the laser material and two reflective end surfaces thereby resulting in a much higher power gain.

Using scattering matrix notation, the equations relating the electromagnetic waves at the input reflecting surface $B_i$ are $$b_1 = a_1 S_{ri} + a_2 S_{ti} \quad (1)$$

$$b_2 = a_1 S_{ti} + a_2 S_{ri} \quad (2)$$

$$a_2 = b_2 S_{ro} e_2{}^{(a-j\beta)} \quad (3)$$

$$b_o = b_2 S_{to} e^{a-j\beta} \quad (4)$$

wherein $S_{ri}$ and $S_{ti}$ are the complex amplitudes of the waves respectively reflected and transmitted by the input reflective surface $B_i$, and $S_{ro}$ and $S_{to}$ are the complex amplitudes of the waves respectively reflected and transmitted by the output reflective surface $B_o$.

Referring to Equations 1 through 4 and FIGURE 1, $a_1$ represents the unamplified laser beam or wave which is transmitted from a laser oscillator and is incident on partial mirror $B_i$ (i.e., the amplifier input), $b_1$ represents the wave reflected back from the amplifier input, $a_2$ represents the wave incident on $B_i$ due to the wave reflected from the amplifier output and amplified by the interviewing medium, $b_2$ represents the wave from the input partial mirror $B_i$ traveling towards the output which subsequently passes through the amplifying laser media to partial mirror $B_o$, and $b_o$ represents the amplified laser beam transmitted through the output partial mirror $B_o$. It can be shown that at resonance, the reflectivities $R_i$ and $R_o$ (the reflection coefficients) of the input and output reflective surfaces $B_i$ and $B_o$, respectively, must be unequal and related by the following equation to provide a matched impedance at the input;

$$R_i = R_o p^2 \quad (5)$$

where $R_i = |S_{ri}|^2$, $R_o = |S_{ro}|^2$ and $p = e^{2a}$ is a pure numeric. Equation 5 is plotted in FIGURE 2 wherein $p$ is not a pure numeric but is in terms of decibels (db) and represents the one-way (single-pass) gain of the amplifier. In order to obtain the matched input impedance condition, that is a reflectionless input wherein the undesired loss due to power reflected from the input is zero and also obtain a maximum power amplification, the assumption is made that the one-way power gain $p$ remains constant for a particular set of conditions. This assumption is valid except for a pulsed laser under conditions of very high input laser beam power level $P_i$ wherein it may not be possible to maintain the degree of population inversion required by the gain during the pulse due to limited pumping power.

From Equations 1–4, the power gain of a matched impedance resonant amplifier can be derived as:

$$\frac{P_o}{P_i} = \frac{1-R_o}{1-R_i} p \quad (6)$$

wherein $P_o/P_i$ is the overall power gain as a pure numeric. Equation 6 is also plotted in FIGURE 2 wherein $P_o/P_i$ is in terms of decibels.

Referring to FIGURE 3, there is shown a gas laser wherein a gaseous laser medium 6 is contained in a suitable glass envelope 7 having a longitudinal axis, and transparent loss-free output windows 8 and 9 are inclined at the Brewster angle and sealed to the glass envelope. Power supply 10 may be a radio frequency (or direct current) source and provides the pumping energy to the laser medium by means of ring electrodes 11 which cause an electrical discharge in the gas mixture within envelope 7. The hereinabove described elements of the gas laser are well known in the art, my invention being specifically directed to the reflectors, designated as a whole by numerals 12, 13 which are spaced apart an integral number of half wave lengths of a specific optical radiation frequency which is characteristic of a selected energy level transition in the particular gaseous medium 6 contained in envelope 7. Reflectors 12 and 13 are indicated in FIGURE 3 as being aligned with the longitudinal axis of envelope 7, it being understood that such alignment is not a limitation since external optical lens networks may be employed whereby one or both of reflectors 12, 13 may be positioned in nonalignment with the envelope longitudinal axis. The criterion of the position of reflectors 12, 13 is that an input unamplified laser beam may enter the laser medium through reflector 12 and the output amplifier laser beam is emitted through reflector 13 as indicated by the arrows. Reflectors 12, 13 may comprise external reflectors as indicated in FIGURE 3, or alternatively, the reflectors in the form of reflective surfaces may be coated directly on the input-output surfaces of the laser material as illustrated in FIGURES 4 and 5. Ideally, such reflecting coatings could also be deposited directly on windows 8 and 9 (in FIGURE 3) if such windows are parallel to each other, transverse to the laser beam axis, and spaced apart the hereinabove mentioned equal number of half wave lengths. However, for practical reasons, external reflectors are, in general, employed with gas lasers. It should also be understood that the illustrated parallel orientation of reflectors 12, 13 is not a limitation of my invention since in many applications, such as an apparatus wherein the external reflectors are not aligned with the laser material and additional optical lenses are employed, the reflectors may be in nonparallel orientation. Finally, the illustrated planar construction of the reflectors is also not a limitation since nonplanar reflectors are also known to be useful in defining the laser optical resonant cavity.

Referring now to the details of external reflectors 12 and 13 in FIGURE 3, each reflector comprises a substrate member 17 fabricated from a totally transparent loss-free dielectric material such as quartz or sapphire, and one or more coatings of selected dielectric materials are deposited thereon. Substrate member 17 must have a very smooth surface to prevent distortion of the laser beam in its passage therethrough. One side of each substrate member is coated, in general, with multilayer dielectric coatings which are assumed to be lossless, each particular coating having a known reflection coefficient to provide a composite coating having a predetermined reflection coefficient (the $R_i$ and $R_o$ coefficients). The other side of each substrate member is preferably coated with a dielectric material of the conventionally known antireflecting type to prevent undesired interference between the composite reflecting coating and substrate material. Ideally, it makes no difference whether the composite reflecting coating is placed on the side of the substrate member adjacent to or removed from the laser medium, but for practical reasons it is preferred to have the reflecting coating on the side adjacent and the antireflecting coating on the side removed therefrom. Thus, antireflecting coatings 14 are illustrated in FIGURE 3 as being on the outer surface of substrate members 17, and reflective coatings 15 and 16 are indicated as being deposited on the inner surface thereof. The antireflecting coatings 14 may comprise a known dielectric material such as magnesium fluoride that is one quarter wave length thick at the laser wave length. The composite reflecting coating 15 on the input reflector 12 and composite reflecting coating 16 on output reflector 13 each comprise one or a plurality of individual (alternating) coatings, each one half wave length thick at the laser frequency, wherein the number and type is dependent upon the particular laser medium employed, the optical frequency involved, the desired reflectivities to be attained, the desired one-way power gain and overall power gain of the laser amplifier. The particular dielectric materials employed in a composite reflecting coating of two alternating materials must have the following characteristics (1) highly transparent (and thus have substantially zero absorption) (2) noncrystallizing (3) unequal refractive indices for the two materials (4) easily evaporated (for deposition). Zinc sulfide is a typical material used, and a single layer may be employed to obtain reflectivities in the order of 15 to 25%. In multilayer coatings, alternate coatings of zinc sulfide and magnesium fluoride are used, the latter material acting as a separating means for the zinc sulfide. Fifteen or more coatings may be utilized, the higher number obtaining the higher reflectivities. Examples of the composite reflection coefficients that may be obtained are illustrated in publications of the Perkin-Elmer Corporation which fabricates such coatings. As a typical example, and with reference to the graph of FIGURE 2, a resonant laser amplifier having a one-way power gain $p=1.259$ (or 1 db) and overall power gain $$\frac{P_o}{P_i} = 10$$

(or 10 db), has a composite input reflection coefficient $R_i$ of 0.95, and a composite output reflection coefficient $R_o$ of 0.60. An input composite reflecting coating 15 having a composite reflection coefficient of 0.95 may comprise approximately eleven alternating layers of zinc sulfide and magnesium fluoride. Output composite reflecting coating 16 having a composite reflection coefficient of 0.6 may comprise approximately seven alternating layers of the two materials. Thus, the resonant laser amplifier wherein the optical resonant cavity thereof is defined by reflecting surfaces having the above-described reflection coefficients, or any other reflection coefficients satisfying Equation 5, provides a matched input impedance which results in a reflectionless input and thus suffers no loss due to power reflected from the input. Overall power gain of the resonant laser amplifier may be determined from Equation 6 or FIGURE 2 and represents a higher laser gain than can be obtained with a symmetrical laser amplifier (having equal reflectivities at input and output) which does not provide matched input impedance and thus suffers loss at the input due to power reflected therefrom.

Composite reflecting coatings 15, 16 may also be applied directly to the end surfaces of a laser media in the case wherein such media is a solid as in FIGURES 4 and 5. In FIGURE 4, the conventional rod-type laser is illustrated wherein the laser material 6 is an elongated form (longitudinal dimension exceeding the transverse dimension). One or more lamps 17 of the flash or continuously operating type optically pump the laser material through the side surface thereof into a metastable high energy state, the laser rod and lamp being contained within a suitable housing 18 and the lamp energized from a suitable power supply 10. In FIGURE 5, a disk-shaped laser is illustrated (the longitudinal dimension being smaller than the transverse dimension) wherein the laser material 6 is optically pumped through the end surfaces thereof by circular lamps 17. The reflective inner surface of housing 18 directs the optical pumping radiation toward the end surfaces of laser disk 6. Reflecting coatings 15, 16 in FIGURES 4 and 5 which are of the single or multilayer dielectric type hereinbefore described, may thus be applied directly on the end surfaces of the solid laser material 6 as illustrated in FIGURES 4 and 5, or alternatively, may be elements of external reflectors 12 and 13 which are spaced from the laser material end surfaces such that the distance between the reflectors is an integral number of half wave lengths of an optical radiation frequency characteristic of a selected energy level transition in the particular laser media employed. In the latter case, the end surfaces of the laser material must have antireflecting coatings or be cut at the Brewster angle.

The composite reflecting coatings 15, 16 in FIGURES 4 and 5, although illustrated as being deposited on parallel, planar, and aligned end surfaces of the bodies of solid laser material, may also be applied on such end surfaces when they are not parallel or planar. And in the hereinabove described case wherein the reflecting coatings are elements of external reflectors, the external reflectors need not necessarily be aligned with each other.

From the foregoing description, it is apparent that my invention attains the objectives set forth and makes available a resonant laser amplifier having a matched input impedance and thereby suffers no reflected power loss at the input. The matched input impedance condition is obtained by providing the optical resonant cavity of the amplifier with reflective surfaces having unequal reflectivities. The reflection coefficient at the amplifier (cavity) input must be greater than the reflection coefficient at the output to obtain power gain through the amplifier.

Having described my invention and three specific applications thereof, it is believed obvious that modification and variation of my invention is possible in the light of the above teachings. Thus, the composite reflecting coatings can be deposited on planar or curved external reflectors, which are either aligned or nonaligned with the longitudinal axis of the laser material, or may be applied directly on the end surface of the laser material depending upon the type of laser medium employed. Further, the orientation of the two reflecting surfaces need not necessarily be parallel in all cases.

It is, therefore, to be understood that changes may be made in the particular embodiments of my invention described which are within the full intended scope of the invention as defined by the following claims.

What I claim as new and desire to secure by Letters Patent of the United States is:

1. In a laser amplifier comprising a body of laser medium and pumping means therefor,
   a body of laser medium disposed in an optical resonant cavity defined by a first reflective surface through which an input unamplified laser beam may enter and a second reflective surface through which the output amplified laser beam is emitted, said first and second reflective surfaces spaced apart an integral number of half-wave lengths of an optical radiation frequency characteristic of an energy level transition in the laser medium, and
   said first and second reflective surfaces having unequal reflection coefficients wherein the ratio thereof is a predetermined function of the amplifier one-way power gain which results in a reflectionless input to the amplifier.

2. In a matched impedance laser amplifier comprising a body of laser medium and pumping means therefor,
   a body of laser medium disposed between a first reflective surface through which an input unamplified laser beam may enter and a second reflective surface through which the output amplified laser beam is emitted, said first and second reflective surfaces spaced apart an integral number of half-wave lengths of an optical radiation frequency characteristic of an energy level transition in the laser medium, and
   said first and second reflective surfaces having reflection coefficients $R_i$ and $R_o$ respectively and the amplifier having a one-way power gain $p$ related to the reflection coefficients by the ratio $$\frac{R_i}{R_o}=p^2$$

to obtain a reflectionless input to the amplifier.

3. A matched input impedance laser amplifier comprising
   a body of laser medium having first and second reflective surfaces adjacent two opposing ends thereof, said first and second reflective surfaces spaced apart an integral number of half-wave lengths of an optical radiation frequency characteristic of an energy level transition in the laser medium,
   means for exciting the laser medium to an upper energy level, and
   said first and second reflective surfaces having reflection coefficients $R_i$ and $R_o$ respectively and the amplifier having a one-way power gain $p$ related to the reflection coefficients by the ratio $$\frac{R_i}{R_o}=p^2$$

to obtain a reflectionless input to the amplifier.

4. A matched input impedance resonant laser amplifier comprising
   a body of solid laser medium disposed between a first reflective surface through which an input unamplified laser beam may enter and a second reflective surface through which the output amplified laser beam is emitted, said first and second reflective surfaces spaced apart an integral number of half-wave lengths of an optical radiation frequency characteristic of an energy level transition in the laser medium,
   means for optically pumping the laser medium to an upper energy level, and
   said first and second reflective surfaces having reflection coefficients $R_i$ and $R_o$ respectively wherein $R_i$ is greater than $R_o$ and the amplifier having a one-way power gain $p$ related to the reflection coefficients by the ratio $$\frac{R_i}{R_o}=p^2$$

to obtain a reflectionless input to the amplifier.

5. A matched input impedance resonant laser amplifier comprising
   a contained body of gaseous laser medium positioned within an optical resonant cavity defined by first and second composite reflective surfaces, said first and second reflective surfaces spaced apart an integral number of half-wave lengths of an optical radiation frequency characteristic of an energy level transition in the laser medium,
   means for exciting the laser medium to an upper energy level, and
   said first and second reflective surfaces having unequal reflection coefficients $R_i$ and $R_o$ respectively wherein $R_i$ is greater than $R_o$ and the amplifier having a one-way power gain $p$ related to the reflection coefficients by the ratio $$\frac{R_i}{R_o}=p^2$$

to obtain a reflectionless input to the resonant laser amplifier having a power gain $$\frac{P_o}{P_i}=\frac{1-R_o}{1-R_i}p$$

6. The laser amplifier set forth in claim 3 wherein said first and second reflective surfaces are of planar construction.

7. The laser amplifier set forth in claim 3 wherein said first reflective surface is planar and normal to the axis of an input unamplified laser beam and the second reflective surface is planar and normal to the axis of the output amplified laser beam.

8. The laser amplifier set forth in claim 3 wherein said first and second reflective surfaces are parallel to each other.

9. The laser amplifier set forth in claim 4 wherein said first and second reflective surfaces are reflecting coatings applied directly on first and second end surfaces respectively of said body of solid laser medium.

10. The laser amplifier set forth in claim 5 wherein said first and second reflective surfaces are first and second dielectric substrates respectively, said first substrate having a composite multilayer dielectric coating having reflection coefficient $R_i$ at one side thereof and an anti-reflecting coating on the opposite side thereof, said second substrate having a composite multilayer dielectric coating having reflection coefficient $R_o$ at one side thereof and an anti-reflecting coating on the opposite side thereof.

11. The laser amplifier set forth in claim 3 wherein said first and second reflective surfaces are each partially transmissive and have substantially zero absorption at the optical radiation frequency.

References Cited

"Electronics," Dec. 13, 1963, pp. 42–43.
Tomiyasu, "Proc. I.E.E.E.," July 1964, pp. 856–857.
Jacobs et al. "Proc. I.E.E.E.," June 1963, p. 933.

ROY LAKE, *Primary Examiner.*

DARWIN R. HOSTETTER, *Examiner.*